(12) United States Patent
Omata

(10) Patent No.: US 11,195,068 B2
(45) Date of Patent: Dec. 7, 2021

(54) IMAGE FORMING APPARATUS

(71) Applicant: CANON KABUSHIKI KAISHA, Tokyo (JP)

(72) Inventor: Haruhiko Omata, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/748,428

(22) Filed: Jan. 21, 2020

(65) Prior Publication Data

US 2020/0242428 A1  Jul. 30, 2020

(30) Foreign Application Priority Data

Jan. 28, 2019 (JP) .............................. JP2019-012272

(51) Int. Cl.
   *G06K 15/02* (2006.01)
   *G06K 15/14* (2006.01)

(52) U.S. Cl.
   CPC .......... *G06K 15/027* (2013.01); *G06K 15/021* (2013.01); *G06K 15/14* (2013.01)

(58) Field of Classification Search
   CPC ..... G06K 15/022; G06K 15/021; G06K 15/14
   USPC ................. 358/1.6, 1.9, 1.15, 1.13, 1.14
   See application file for complete search history.

(56) References Cited

U.S. PATENT DOCUMENTS

| 7,003,237 | B2 | 2/2006 | Miyamoto et al. |
| 10,180,641 | B2 | 1/2019 | Itagaki |
| 10,990,051 | B2 | 4/2021 | Omata et al. |
| 2004/0184830 | A1* | 9/2004 | Miyamoto ......... G03G 15/5062 399/66 |
| 2006/0181726 | A1* | 8/2006 | Naito .................. G03G 15/043 358/1.14 |
| 2017/0097593 | A1* | 4/2017 | Itagaki ............... G03G 15/5062 |
| 2020/0242426 | A1 | 7/2020 | Omata |

FOREIGN PATENT DOCUMENTS

| JP | 2000-221803 A | 8/2000 |
| JP | 2004-280003 A | 10/2004 |
| JP | 2017-072689 A | 4/2017 |

* cited by examiner

*Primary Examiner* — Quang N Vo
(74) *Attorney, Agent, or Firm* — Venable LLP

(57) ABSTRACT

An image forming apparatus includes an image bearing member; a transfer member; and a controller configured to execute a plurality of modes of outputting a test chart, the modes involving transferring a plurality of test images to the test chart by applying a plurality of different voltages to the transfer member. The modes include a first mode and a second mode, the first mode being a mode in which a number of voltage levels to be applied to the transfer member when the plurality of test images are transferred to the test chart is a first predetermined number, and the second mode being a mode in which the number of voltage levels to be applied to the transfer member when the plurality of test images are transferred to the test chart is a second predetermined number which is greater than the first predetermined number.

9 Claims, 9 Drawing Sheets

STATUS A

VISUAL SPECTRAL CHARACTERISTIC (Visual)

IMAGE FORMING APPARATUS

BACKGROUND OF THE INVENTION

Field of the Invention

The present invention relates to an image forming apparatus such as an electrophotographic copying machine and an electrophotographic printer (for example, a laser beam printer, an LED printer, etc.).

Description of the Related Art

A configuration of an electrophotographic system image forming apparatus is widely known in which a full-color toner image formed by superposing yellow, magenta, cyan, and black toner images is transferred to a sheet by applying a voltage to a transfer member to form an image.

In addition, in such an image forming apparatus, a configuration is described in which a mode of adjusting a transfer voltage to be applied to the transfer member is executed (for example, Japanese Patent Laid-Open No. 2000-221803). In this mode, the transfer voltage to be applied to the transfer member is switched to form a plurality of patch images on the sheet, and the user checks the transferability of the patch images and sets an optimum transfer voltage.

However, in the configuration described in Japanese Patent Laid-Open No. 2000-221803, the number of patch images formed when the above mode is executed is fixed. For this reason, if the optimum transfer voltage changes greatly due to significant changes in installation environment of the image forming apparatus and the state of the sheet, the optimum transfer voltage may not be found even if the above mode is performed once. In this case, control of changing the transfer voltage and re-forming the patch image is conceivable. However, when this control is performed, the execution time of the mode is prolonged.

SUMMARY OF THE INVENTION

It is desirable to provide an image forming apparatus capable of suppressing a prolongation of execution time of a mode of adjusting a transfer voltage.

A representative configuration of an image forming apparatus includes:
an image bearing member;
a transfer member configured to transfer a toner image carried on the image bearing member to a sheet by being applied with a voltage; and
a controller configured to execute a plurality of modes of outputting a test chart for setting a voltage to be applied to the transfer member during image formation, the modes being a mode of transferring a plurality of test images to the test chart by applying a plurality of different voltages to the transfer member;
wherein the plurality of modes include a first mode and a second mode, the first mode being a mode in which a number of voltage levels to be applied to the transfer member when the plurality of test images are transferred to the test chart is a first predetermined number, the second mode being a mode in which the number of voltage levels to be applied to the transfer member when the plurality of test images are transferred to the test chart is a second predetermined number which is greater than the first predetermined number, and the first mode and the second mode are selectively executable.

Further features of the present invention will become apparent from the following description of exemplary embodiments with reference to the attached drawings.

DESCRIPTION OF THE EMBODIMENTS

First Embodiment

<Image Forming Apparatus>

First, the overall configuration of the image forming apparatus according to the first embodiment of the present invention will be described with reference to the drawings together with an operation during image formation. Note that the dimensions, materials, shapes, and relative arrangements of the described components are not intended to limit the scope of the present invention only to those unless otherwise specified.

The image forming apparatus A transfers yellow, Y magenta M, cyan C, and black K toners to an intermediate transfer belt, and then transfers images to a sheet to form an image. Note that, in the following description, the members that use the toners of the above-described respective colors are associated with letters Y, M, C, and K, but the configuration and operation of each member are substantially the same except that the colors of the toner to be used are different from each other. Therefore, these letters are omitted as appropriate unless distinction is required.

Figure 1:
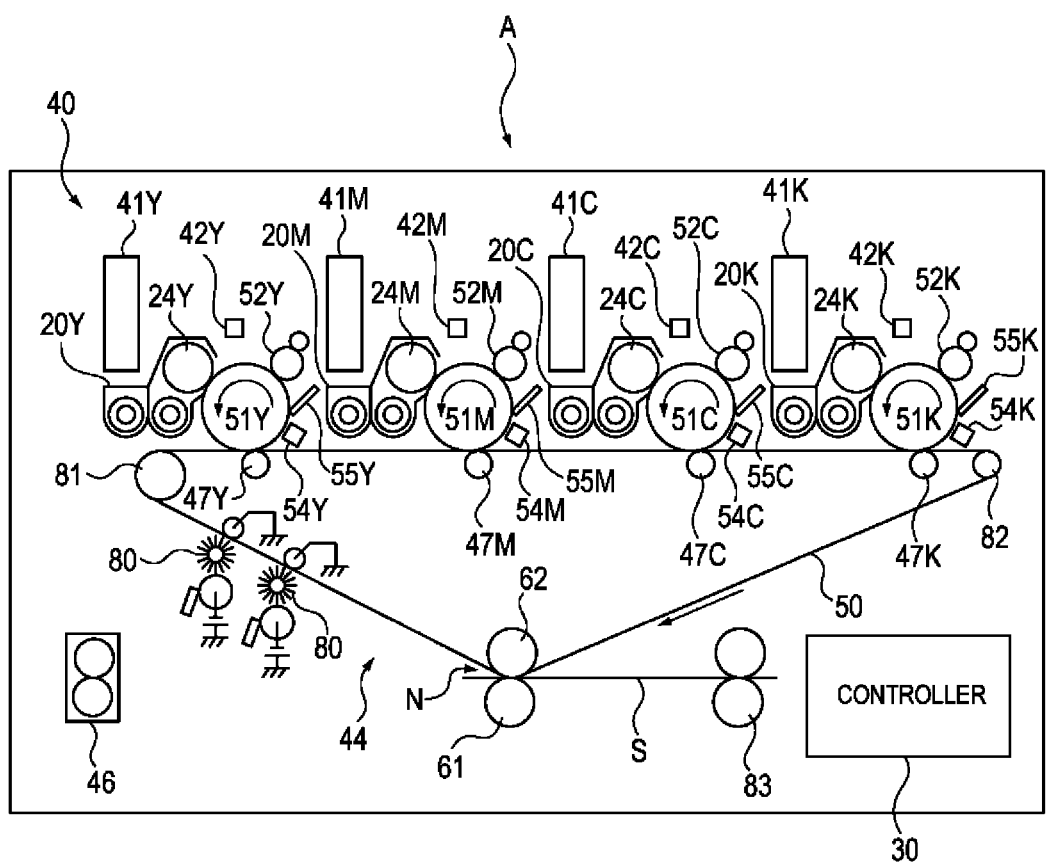
FIG. 1 is a schematic cross-sectional view of an image forming apparatus.

As illustrated in FIG. 1, the image forming apparatus A includes an image forming portion 40 configured to transfer a toner image onto a sheet S to form an image, a sheet feeding portion, not illustrated, configured to feed the sheet toward the image forming portion 40, and a fixing device 46 as a fixing portion configured to fix the toner image on the sheet. Note that examples of the sheet S used for image formation include plain paper, a synthetic resin sheet, cardboard, and an overhead projector sheet.

The image forming portion 40 includes a photosensitive drum 51 (51Y, 51M, 51C, 51K) and a rubber charging roller 52 (52Y, 52M, 52C, 52K) configured to charge the surface of the photosensitive drum 51. Further, a laser scanner unit 42 (42Y, 42M, 42C, 42K) and a developing device 20 (20Y, 20M, 20C, 20K) are provided. Also, a drum cleaner 55 (55Y, 55M, 55C, 55K), a pre-exposure device 54 (54Y, 54M, 54C, 54K), and an intermediate transfer unit 44 are provided.

The intermediate transfer unit 44 includes a primary transfer roller 47 (47Y, 47M, 47C, 47K), an intermediate transfer belt 50 (image bearing member), a secondary transfer roller 61, a secondary transfer counter roller 62, a tension roller 82, a driving roller 81, and a belt cleaner 80.

The photosensitive drum 51 (photosensitizer) is a negatively charged organic photosensitizer (OPC) having an outer diameter of 30 mm. The photosensitive drum 51 has a three-layer structure in which an undercoat layer, a photocharge generation layer, and a charge transport layer are sequentially coated on an outer peripheral surface of an aluminum cylinder.

The developing device 20 includes an aluminum developing sleeve 24 (24Y, 24M, 24C, 24K). Inside the developing sleeve 24, a magnet roller, not illustrated, is included in a non-rotating state. The developing sleeve 24 bears a developer containing non-magnetic toner and a magnetic carrier and conveys the developer to a developing region at a position facing the photosensitive drum 51. Note that, when the developer in the developing device 20 decreases, an additional developer is supplied from toner bottle 41 (41Y, 41M, 41C, 41K) to the developing device 20.

The primary transfer roller 47 includes an elastic layer of ion conductive foamed rubber (NBR rubber) and a metal core, has an outer diameter of 15 to 20 mm, and an electrical resistance of $1\times10^5$ to $1\times10^8 \Omega$ (measurement environment: 23° C., 50% RH, applied voltage 2 kV).

The intermediate transfer belt 50 is stretched by a tension roller 82, a secondary transfer counter roller 62, and a driving roller 81 and rotates around the driving roller 81 as the driving roller 81 rotates. The tension roller 82 pushes the intermediate transfer belt 50 outward by a biasing force of a spring, not illustrated. Accordingly, a tension on the order of 2 to 5 kg is applied to the intermediate transfer belt 50.

The intermediate transfer belt 50 includes three layers: a base layer, an elastic layer, and a surface layer. In the present embodiment, the polyimide base layer has a thickness of 85 µm, the elastic layer made of CR rubber containing an ionic conductive agent and carbon black has a thickness of 260 µm, and the surface layer made of urethane containing PTFE has a thickness of 2 µm. The intermediate transfer belt 50 has an initial volume resistivity of $5\times10^9 \Omega \cdot cm$ and an MD1 hardness of 70 degrees.

Note that the base layer is made of a material containing an appropriate amount of carbon black as an antistatic agent in resins such as polyimide and polycarbonate or various rubbers, and has a thickness of 0.05 mm to 0.15 mm. The elastic layer is made of a material obtained by adding an appropriate amount of the ionic conductive agent to various rubbers such as urethane rubber and silicone rubber, and has a thickness of 0.1 mm to 0.500 mm in terms of followability to irregularity on the sheet S and durability of the sheet S. The surface layer is made of, for example, a single type of resin material such as polyurethane, polyester, and epoxy resin, or two or more types of elastic materials such as elastic material rubber, elastomer, butyl rubber, etc., as the base material, and the thickness is 0.0002 mm to 0.020 mm. In addition, in consideration of the transferability of the toner to the sheet S, for example, one or two, or more types of powders or particles such as a fluororesin or a material having a different particle size are dispersed in this base material as a material for improving the lubricity to form the surface layer.

The intermediate transfer belt 50 has a volume resistivity of $5\times10^8$ to $1\times10^{14}$ $\Omega \cdot cm$ (measuring environment: 23° C., 50% RH) and a hardness of 60 to 85° in MD1 hardness (measuring environment: 23° C., 50% RH). The coefficient of static friction is 0.15 to 0.6 (measuring environment: 23° C., 50% RH, measuring instrument: type 94i manufactured by HEIDON).

The secondary transfer roller 61 is abutted and disposed on an outer peripheral surface of the intermediate transfer belt 50. The secondary transfer roller 61 includes a metal core and an elastic layer of ion conductive foamed rubber (NBR rubber), and is a roller having an outer diameter of 20 to 25 mm. The electrical resistance of the secondary transfer roller 61 is adjusted to $1\times10^5$ to $1\times10^8 \Omega$ (N/N (23° C., 50% RH measurement), 2 kV applied).

Next, an image forming operation will be described. The image forming apparatus A is configured to be capable of executing a mode of forming a toner image of each color on each of the four photosensitive drums 51 to form a full color image, and a monochrome mode of forming a black toner image on the photosensitive drum 51K to form an image of a single black color. Hereinafter, a mode of forming a full-color image will be described.

Figure 2:
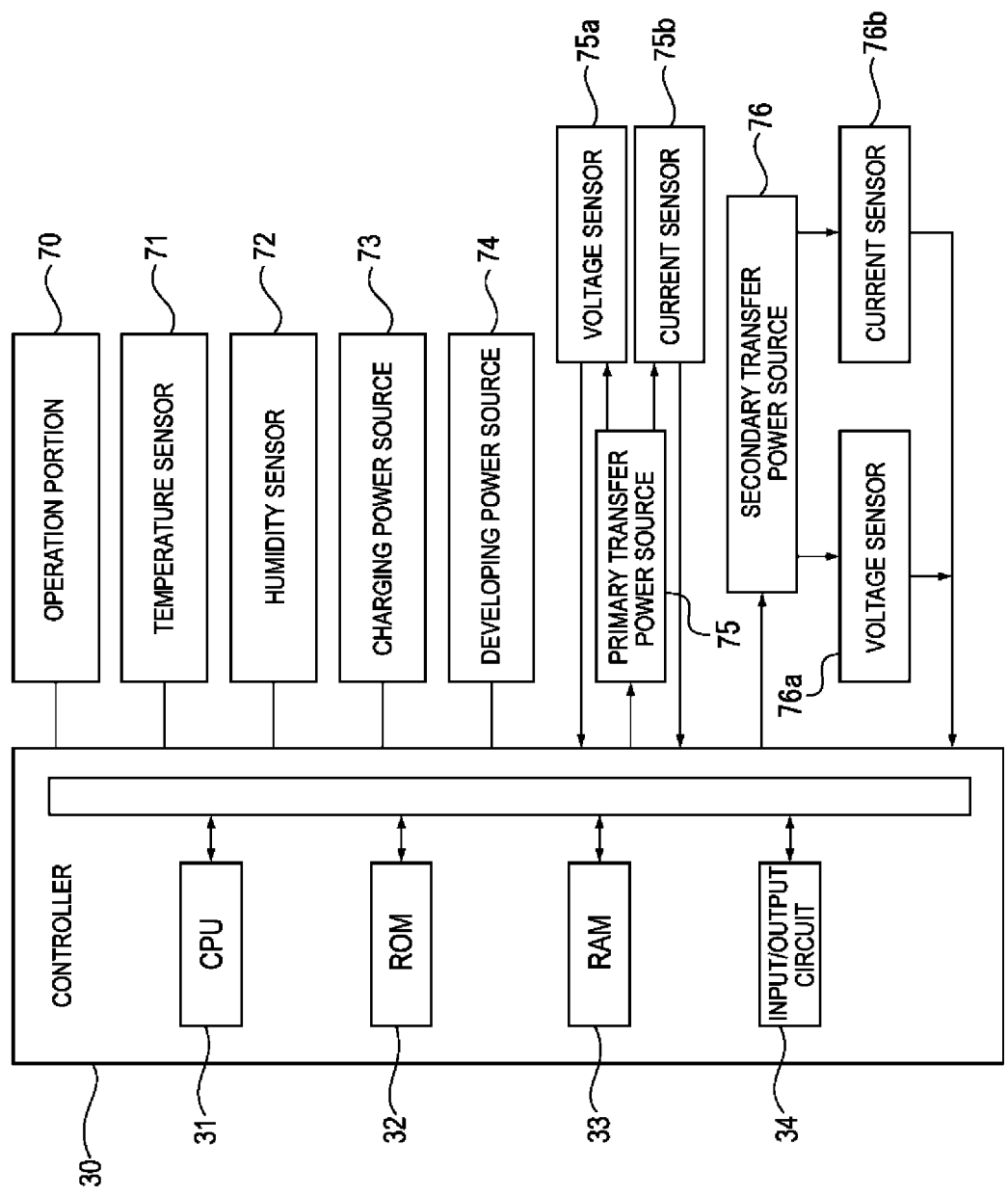
FIG. 2 is a block diagram illustrating a part of a system configuration of the image forming apparatus.

First, when the controller 30 illustrated in FIG. 2 receives an image forming job signal, a sheet S is fed from a stack of sheets stored in a sheet cassette, not illustrated, by a feeding roller, not illustrated. Subsequently, the sheet S is conveyed by a registration roller 83 to a secondary transfer portion N formed by the secondary transfer roller 61 and the secondary transfer counter roller 62.

In contrast, in the image forming portion 40, first, a DC voltage is applied to the charging roller 52, so that the surface of the photosensitive drum 51 in contact with the charging roller 52 is charged. Subsequently, the laser scanner unit 42 irradiates the surface of the photosensitive drum 51 with a laser beam in accordance with an image signal transmitted from a host device such as an original reading device or a personal computer, not illustrated, or an external device such as a digital camera or a smartphone. Accordingly, an electrostatic latent image is formed on the surface of the photosensitive drum 51.

Subsequently, a DC voltage is applied to the developing sleeve 24 of the developing device 20, so that toner is attached to the electrostatic latent image formed on the surface of the photosensitive drum 51, so that a toner image is formed on the surface of the photosensitive drum 51. The toner image formed on the surface of the photosensitive drum 51 in this manner is sent to a primary transfer portion formed from the photosensitive drum 51 and the primary transfer roller 47.

A primary transfer voltage having a positive polarity opposite to a charging polarity of the toner is applied to the primary transfer roller 47, so that the toner image sent to the primary transfer portion is primarily transferred to the intermediate transfer belt 50. Accordingly, the toner images of the respective colors are sequentially superimposed on the intermediate transfer belt 50 to form a full-color toner image.

Subsequently, the toner image is sent to the secondary transfer portion N by a rotation of the intermediate transfer belt 50. Then, in the secondary transfer portion N, a secondary transfer voltage having a polarity opposite to the charging polarity of the toner and being controlled to a constant voltage is applied to the secondary transfer roller 61, so that the toner image on the intermediate transfer belt 50 is secondarily transferred to the sheet S.

In the present embodiment, constant voltage control is used to control the secondary transfer voltage, a DC voltage on the order of +1 kV to +7 kV is applied as the secondary transfer voltage, and a secondary transfer current on the order of +40 µA to +120 µA is passed. The metal core of the secondary transfer counter roller 45a is connected to the ground potential. Note that in the present embodiment, a configuration is described in which a voltage is applied to the secondary transfer roller 45b to perform secondary transfer, but a configuration in which a voltage is applied to the secondary transfer counter roller 45*a* to perform the secondary transfer is also applicable.

The sheet S having the toner image transferred thereto is sent to the fixing device 46. Then, the toner image is fixed on the sheet S by being heated and pressurized by the fixing device 46. Subsequently, the sheet S is discharged to the outside of the image forming apparatus A.

Note that after the primary transfer of the toner image from the photosensitive drum 51 to the primary transfer roller 47, the surface of the photosensitive drum 51 is neutralized by the pre-exposure device 54. Subsequently, the toner remaining on the surface of the photosensitive drum 51 is scraped off and removed by the drum cleaner 55 configured to abut the photosensitive drum 51 with a predetermined pressing force. Further, the toner remaining on the intermediate transfer belt 50 after the secondary transfer is removed by the belt cleaner 80.

<Controller>

Next, an outline of the system configuration of the image forming apparatus A will be described.

FIG. 2 is a block diagram illustrating a part of the system configuration of the image forming apparatus A. As illustrated in FIG. 2, the image forming apparatus A includes a controller 30 having a CPU 31, a ROM 32, a RAM 33, and an input/output circuit 34.

The ROM 32 stores various data such as control programs and tables. The CPU 31 performs various types of arithmetic processing based on the control program and information stored in the ROM 32. The RAM 33 temporarily stores data.

That is, in the controller 30, the CPU 31 controls each device of the image forming apparatus A while using the RAM 33 as a work area based on the control program stored in the ROM 32. Then, the above-described image forming operation such as toner image formation on the photosensitive drum 51 is executed through the control of each device.

The input/output circuit 34 inputs and outputs a signal to and from the outside. The CPU 31 is connected to a sheet feeding portion, not illustrated, an image forming portion 40 and an operation portion 70, described later, via the input/output circuit 34 and performs control by exchanging signals with each portion.

An operation portion 70 is connected to the controller 30. The operation portion 70 is a touch panel member including operation buttons arranged on a screen of a liquid crystal panel. The user can perform various settings related to image formation and execute an image forming job by operating the operation portion 70. The controller 30 receives a signal from the operation portion 70 and operates various devices of the image forming apparatus A.

The controller 30 is connected to a temperature sensor 71 configured to detect an in-machine temperature and a humidity sensor 72 configured to detect the in-machine humidity. The temperature detected by the temperature sensor 71 and the humidity detected by the humidity sensor 72 are entered to the controller 30 as signals.

The controller 30 includes a charging power source 73 configured to apply a voltage to the charging roller 52, a developing power source 74 configured to apply a voltage to the developing sleeve 24, a primary transfer power source 75 configured to apply a voltage to the primary transfer roller 47, and a secondary transfer power source 76 configured to apply a voltage to the secondary transfer roller 61. The controller 30 controls these power supplies and applies a voltage to each member.

A voltage sensor 75*a* and a current sensor 75*b* are connected to the primary transfer power source 75. The voltage sensor 75*a* detects the value of the voltage applied from the primary transfer power source 75 to the primary transfer roller 47. The current sensor 75*b* detects the value of the primary transfer current that flows when a voltage is applied from the primary transfer power source 75 to the primary transfer roller 47. Note that four primary transfer power sources 75, four voltage sensors 75*a* and four current sensors 75*b* are provided corresponding to the four primary transfer rollers 47, respectively. The controller 30 can individually control these members.

Further, a voltage sensor 76*a* and a current sensor 76*b* are connected to the secondary transfer power source 76. The voltage sensor 76*a* detects the value of the voltage applied from the secondary transfer power source 76 to the secondary transfer roller 61. The current sensor 76*b* (current detecting unit) detects the value of the secondary transfer current that flows when a voltage is applied from the secondary transfer power source 76 to the secondary transfer roller 61.

<ATVC Control>

In the secondary transfer process, a current flows from the secondary transfer roller 61 to the secondary transfer counter roller 62 via the intermediate transfer belt 50. Here, as the image forming apparatus A is used, the electrical resistances of the secondary transfer roller 61, the intermediate transfer belt 50, and the secondary transfer counter roller 62 vary. For this reason, if it is desired to flow a desired secondary transfer current in the secondary transfer process, it is necessary to correct the value of the voltage applied to the secondary transfer roller 61 in accordance with variations in the electrical resistance.

Therefore, the image forming apparatus A performs ATVC control (another setting mode) that corrects the value of the secondary transfer voltage in accordance with the variations in the electrical resistance of the secondary transfer roller 61, the intermediate transfer belt 50, and the secondary transfer counter roller 62. Hereinafter, the ATVC control will be described.

The ATVC control is performed during non-image formation. First, the controller 30 applies several types of voltages from the secondary transfer power source 76 to the secondary transfer roller 61. At this time, the voltage sensor 76*a* detects several types of voltage values applied to the secondary transfer roller 61, respectively. The current sensor 76*b* detects the value of the current that flows when several types of voltages are applied to the secondary transfer roller 61. Next, the controller 30 determines a value of the secondary transfer voltage Vb that allows a target current to be output in the secondary transfer process to flow based on the relationship between the values of several types of voltages applied to the secondary transfer roller 61 and the current values flowing at that time.

For example, first, a voltage $\varepsilon 1$ is applied from the secondary transfer power source 76 to the secondary transfer roller 61, and the current $\omega 1$ flowing at that time is detected by the current sensor 76*b*. If the current value detected by the current sensor 76*b* is smaller than the target current value, the voltage $\varepsilon 2$ larger than the voltage $\varepsilon 1$ is next applied from the secondary transfer power source 76 to the secondary transfer roller 61, and the current $\omega 2$ flowing at that time is detected by the current sensor 76*b*. Subsequently, the relationship between the voltage $\varepsilon 1$ and the current $\omega 1$ and the relationship between the voltage $\varepsilon 2$ and the current $\omega 2$ are linearly approximated to obtain the value of the secondary transfer voltage Vb that allows the target current to flow. Note that the types of voltages to be applied are not limited to two but may be three or more.

In the secondary transfer process, a secondary transfer current flows from the secondary transfer roller 61 to the secondary transfer counter roller 62 via the intermediate transfer belt 50 and the sheet S. For this reason, the impedance becomes higher by the amount of the sheet S than when ATVC control is executed. Therefore, at the secondary transfer voltage Vb determined by the ATVC control, a desired secondary transfer current cannot be passed, thereby resulting in a transfer failure.

Therefore, in consideration of the increase in impedance due to the sheet S, a divided voltage Vp of the sheet S, which is a voltage necessary for flowing a desired secondary transfer current, is applied in addition to the secondary transfer voltage Vb determined by ATVC control. That is, in the secondary transfer process, a voltage of Vb+Vp is applied as the secondary transfer voltage.

The ROM 32 stores a table, not illustrated, in which a type and a basis weight of the sheet S, a temperature and a humidity inside the image forming apparatus A, and a value of the divided voltage Vp of the sheet S are associated with each other. The controller 30 refers to the table, not illustrated, and determines the divided voltage Vp from the type and the basis weight of the sheet S selected by the user operating the operation portion 70 or a personal computer, and the temperature and humidity in the apparatus detected by the temperature sensor 71 and the humidity sensor 72.

<Setting Mode>

As described above, the value of the secondary transfer voltage is determined by ATVC control and the table, not illustrated. However, if the moisture content and electrical resistance of the sheet S used for image formation are significantly different from those of a standard sheet, the desired secondary transfer current does not flow at the value of the divided voltage Vp set in the table, not illustrated, which may result in a transfer failure. For example, if the moisture content of the sheet S used for image formation is significantly lower than that of a standard sheet, abnormal electric discharge may occur when secondary transfer is performed with the divided voltage Vp set in the table, not illustrated.

Therefore, the image forming apparatus A executes a setting mode for setting an appropriate secondary transfer voltage. In the setting mode, the image forming apparatus A adjusts the secondary transfer voltage in accordance with the type and the moisture content of the sheet S used for image formation. Hereinafter, this setting mode will be described with reference to the flowchart illustrated in FIG. 3.

Figure 3:
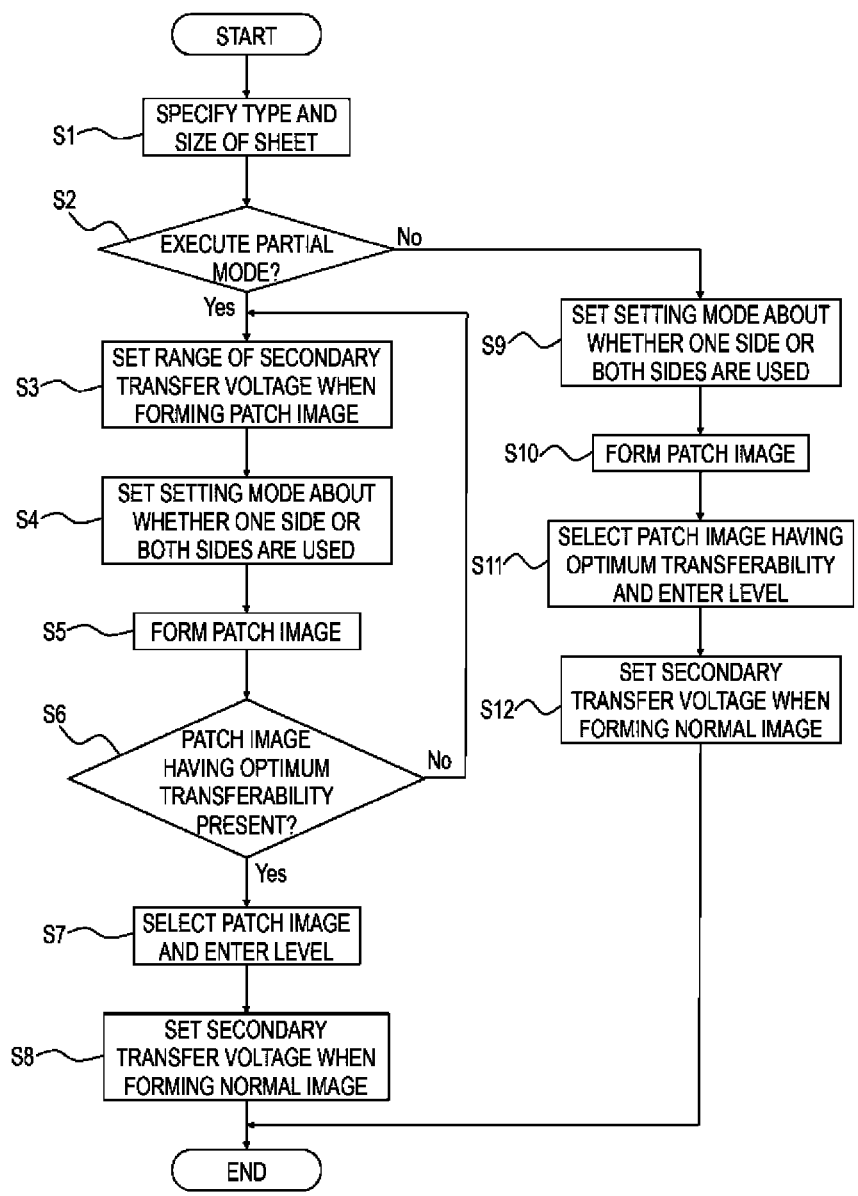
FIG. 3 is a flowchart of a setting mode.
Figure 4A:
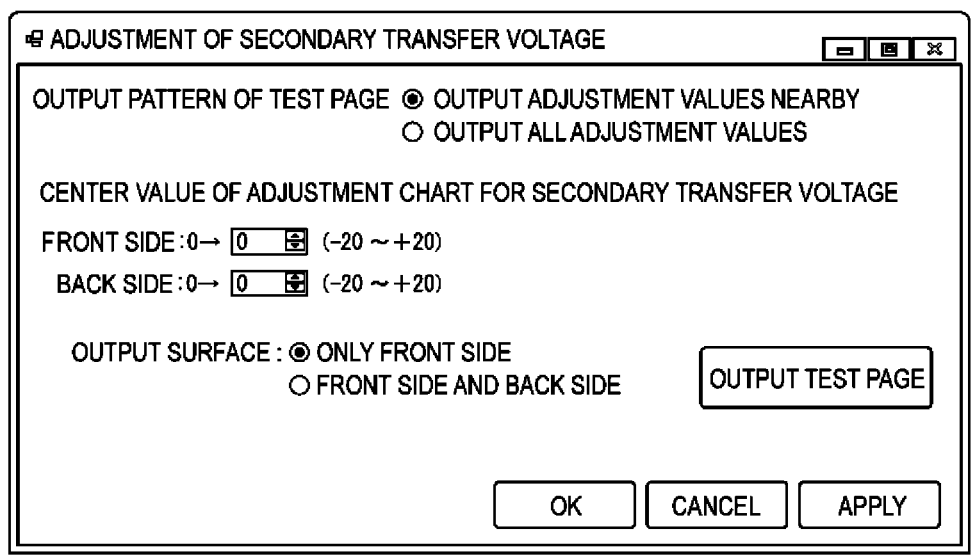
FIG. 4A and FIG. 4B are diagrams each illustrating a display screen of an operation portion.

As illustrated in FIG. 3, the user first operates the operation portion 70 (sheet setting portion) to select a sheet cassette, not illustrated, in which the sheet S used for image formation is stored (S1). Accordingly, the type and the size of the sheet S are specified. Here, the type and size of the sheet S accommodated in the sheet cassette can be stored and registered in the ROM 32 for each sheet cassette by the user operating the operation portion 70. In the present embodiment, as a registration method, three types of methods may be employed: a method of registering the sheet S according to the size and the basis weight such as A3 plain paper or A4 cardboard, a method of registering the sheet S by brand information, and a method of registering the sheet S by the user directly entering the size and the basis weight. Note that a plurality of items of the brand information is registered in advance in the ROM 32, and the user selects a brand of the sheet S from the registered information. When the type and the size of the sheet S are specified, the appearance of a display screen of the operation portion 70 is as illustrated in FIG. 4A.

Next, when forming a patch image, described later, the user selects a full mode (second mode) in which the image forming apparatus A forms all the possible patch images or a partial mode (first mode) in which part of all the patch images are formed (S2). The user selects the "output all adjustment values" button in order to select the full mode and selects the "output adjustment values nearby" button in order to select the partial mode on the screen illustrated in FIG. 4A. That is, the operation portion 70 is a selecting portion for selecting whether to execute the partial mode or the full mode. Here, the screen of the operation portion 70 illustrated in FIG. 4A is displayed in a state in which the partial mode is automatically selected as a default setting (the "output adjustment values nearby" button is checked). This is because it is assumed that the full mode is used if the type of sheet S cannot be specified, or if the setting mode is executed for the sheet S selected for the first time in step S1, and that the partial mode is usually used.

Next, on the screen illustrated in FIG. 4A, the user sets a secondary transfer voltage range for forming a patch image, described later (S3). Specifically, the reference value (center value) of the secondary transfer voltage when a patch image is formed is set at ±20 levels. That is, the operation portion 70 is a voltage setting portion configured to set a range (predetermined range) of the secondary transfer voltage when a patch image is formed. Here, if "0" is selected as the reference value, a value obtained by adding the secondary transfer voltage Vb set by the above-described ATVC control to the divided voltage Vp set in the table, not illustrated, stored in the ROM 32 about the sheet S is selected as a reference value for the secondary transfer voltage.

In the present embodiment, one level corresponds to 150 V. For this reason, for example, if "+1" is selected as the reference value, the voltage obtained by adding 150 V to the value of the divided voltage Vp set in the table, not illustrated, for the sheet S and the secondary transfer voltage Vb set by ATVC control corresponds to the reference value. That is, in the present embodiment, the reference value of the secondary transfer voltage when a patch image is formed can be set in the range of 3000 V. Note that the voltage value corresponding to one level and the number of levels that can be set are not limited to the numerical values described above and may be other numerical values.

Next, whether to perform the setting mode on one side or on both sides of the sheet S is set (S4). Subsequently, when the user presses the "output test page" button illustrated in FIG. 4A, the secondary transfer voltage is switched at ±5 level with respect to the reference value, and eleven patch images (test images) are transferred to the sheet S (S5). In this manner, a test chart that is the sheet S on which a plurality of patch images is formed is output.

For example, if a double-side coated sheet having a basis weight of 350 g/m² and an A3 size is selected as the sheet S to be used for image formation and the reference value is "0", the reference secondary transfer voltage value is 2500 V. Therefore, eleven patch images are formed with the secondary transfer voltages switched from 1750 V to 3250 V by 150 V with reference to 2500 V. That is, the controller 30 transfers the plurality of patch images to the sheet S by switching the secondary transfer voltage to be applied to the secondary transfer roller 61 by 150 V (predetermined value) within a predetermined range centering on the reference value. That is, the controller 30 applies a plurality of different voltages to the secondary transfer roller 61 and outputs a plurality of patch images to be transferred when the plurality of voltages is applied.

Note that the lower limit value of the secondary transfer voltage level when a patch image is formed is "−20", and the upper limit value is "+20". For this reason, for example, even if "+17" is selected as the reference value, a patch image of a level higher than "+20" is not formed, and for the part exceeding "+20", patch images of "+20" are repeatedly formed. That is, eight patch images each from "+12" to "+19" are formed, and three patch images "+20" are formed.

Figure 5A:
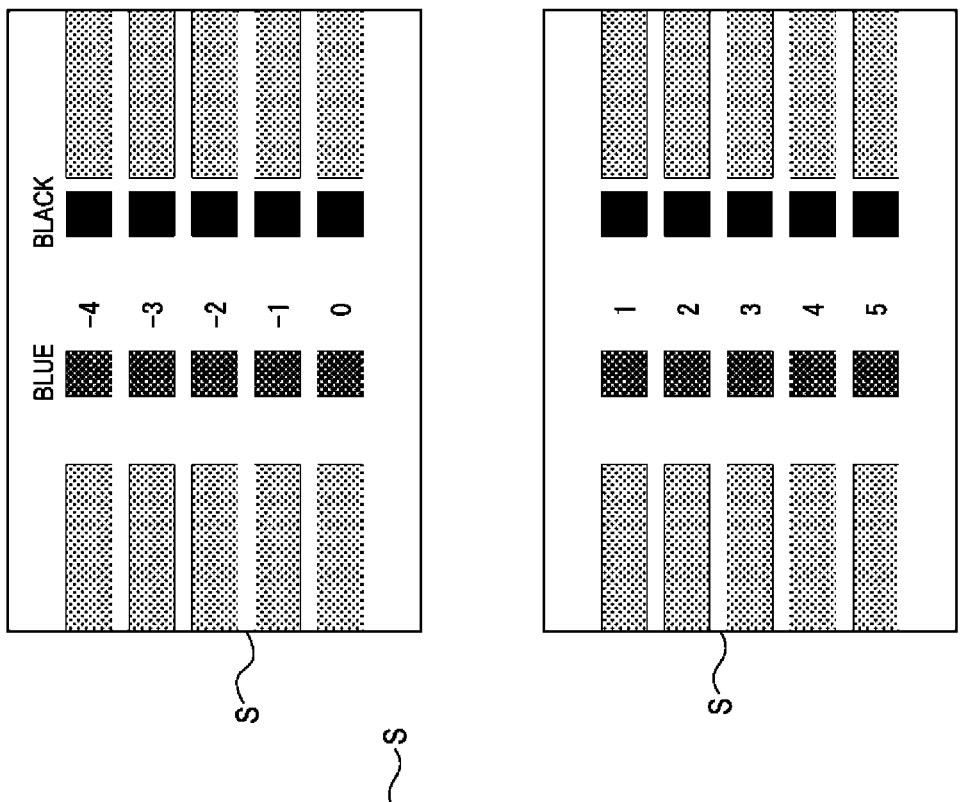
FIG. 5A and FIG. 5B are diagrams each illustrating a state in which a patch image is formed on a sheet.
Figure 5B:
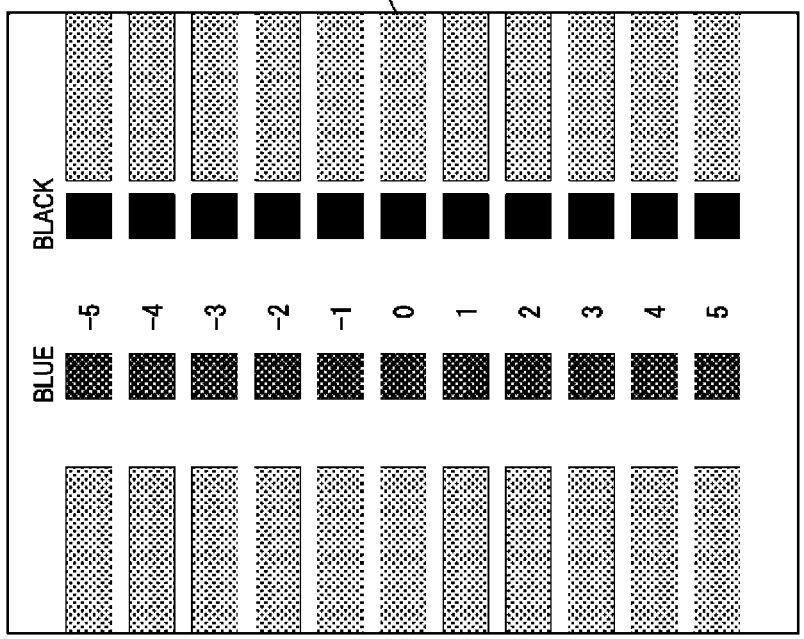

FIG. 5A is a diagram illustrating a state in which a patch image is formed on a sheet S having a length of 420 to 487 mm in the conveyance direction. FIG. 5B is a diagram illustrating a state in which a patch image is formed on the sheet S having a length of 210 to 419 mm in the transport direction. As illustrated in FIG. 5, the level of the secondary transfer voltage is described in the vicinity of each patch image. If eleven patch images do not fit on one sheet S, patch images are formed on two sheets S. Note that in the present embodiment, if patch images are formed on an A4 size sheet S, since eleven patch images cannot fit on two sheets S, 10 patch images are formed on the sheet S as an exception.

Here, the size of the patch image needs to be a size that allows the user to easily determine the transferability. The transferability of a blue solid image and a black solid image is difficult to discriminate if the size of the patch image is small. Therefore, the size of the patch image is preferably 10 mm square or more, and more preferably 25 mm square or more.

Figure 4B:
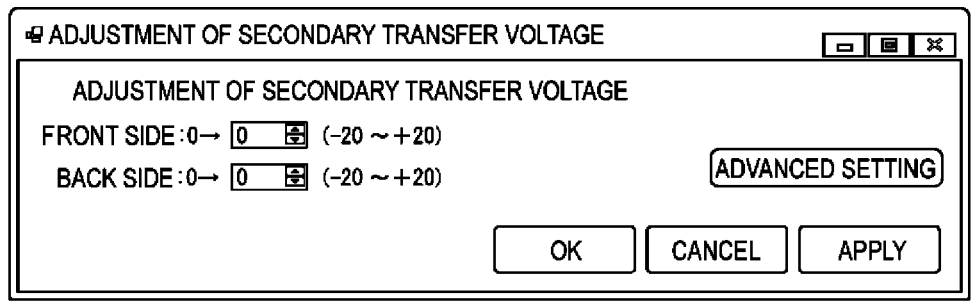

Next, when the user selects the "OK" button illustrated in FIG. 4A, the screen illustrated in FIG. 4B is displayed. The user selects a patch image having the optimum transferability from the eleven patch images formed on the sheet S. Then, on the screen illustrated in FIG. 4B, the level of the secondary transfer voltage written together with the selected patch image is entered (S6, S7). That is, the operation portion 70 is a selecting portion configured to enter the selected patch image (selected image). Subsequently, when the user presses the "OK" button illustrated in FIG. 4B, the controller 30 sets the secondary transfer voltage corresponding to the selected level as the secondary transfer voltage to be applied during normal image formation and exits the setting mode (S8).

Here, the value of the secondary transfer voltage is increased stepwise from the smaller value, and a voltage at which the toner is transferred in a secondary color such as blue is a guideline for the lower limit value. Further, the voltage value is further increased from this lower limit value, and the voltage at which image defects occur in the black solid image and the halftone portion is a guideline for the upper limit value. When the user sets the level of the secondary transfer voltage within the range between the upper limit value and the lower limit value, desirable transferability is easily obtained.

If there is no patch image having optimum transferability among the eleven patch images formed on the sheet S, the process returns to step S2, and the user again selects the reference value of the secondary transfer voltage when the patch image is formed (S6). Subsequently, patch images are output in the same manner as described above, a patch image having an optimum transferability is selected, and a level is entered (S3 to S7). Subsequently, the "OK" button illustrated in FIG. 4B is selected to exit the setting mode.

In contrast, if the full mode is selected, the user first sets whether the setting mode is to be performed on one side or on both sides of the sheet S (S9). Subsequently, when the user presses the "output test page" button illustrated in FIG. 4A, all patch images that can be formed by the image forming apparatus A are formed on the sheet S (S10). That is, in the present embodiment, since the secondary transfer voltage during patch image formation can be set at ±20 levels with reference to the "0" level, a total of 41 patch images are formed. That is, there are more types of voltage values to be applied to the secondary transfer roller 61 when the patch image is transferred in the full mode than in the partial mode. Note that if the setting mode is executed using the A3 size sheet S, 41 patch images are transferred to the four sheets S.

Next, when the user selects the "OK" button illustrated in FIG. 4A, the screen illustrated in FIG. 4B is displayed. The user selects a patch image with the optimum transferability from 41 patch images formed on the sheet S. Then, the level of the secondary transfer voltage written together with the selected patch image is entered and selected on the screen illustrated in FIG. 4B (S11). Subsequently, when the user presses the "OK" button illustrated in FIG. 4B, the controller 30 sets the secondary transfer voltage corresponding to the selected level as the secondary transfer voltage to be applied during normal image formation and exits the setting mode (S12).

In this manner, in the setting mode, the controller 30 sets a voltage to be applied from the secondary transfer power source 76 to the secondary transfer roller 61 during image formation based on the voltage corresponding to the patch image selected by the user from the plurality of patch images transferred to the sheet S. Accordingly, even if the moisture content and electrical resistance of the sheet S used for image formation are greatly different from those of a standard sheet, desirable transferability can be ensured.

Here, there are mainly two types of timing when the user executes the setting mode. First, one is timing when the optimum secondary transfer voltage for forming an image on a daily use sheet S changes as the installation environment of the image forming apparatus A changes or as the moisture content of the sheet S changes. In this case, this is often applicable in the partial mode because the possibility of finding an appropriate value may be increased by changing the secondary transfer voltage a little.

The second is timing when the optimum secondary transfer voltage changes in order to use a sheet S that is used for the first time or a special sheet S such as a synthetic sheet. In this case, there is a high possibility that the optimum secondary transfer voltage value will change greatly compared to the normal value. Accordingly, there is a possibility that an optimum secondary transfer voltage cannot be found in eleven patch images formed in a partial mode, and thus repeated formation of patch images may be demanded.

Therefore, as in the present embodiment, the partial mode and the full mode having a larger number of patch images than the partial mode are made executable. That is, the controller 30 can selectively execute the partial mode having a predetermined number (first predetermined number) of voltage levels to be applied to the secondary transfer roller 61 when the patch image is transferred is a predetermined number (first predetermined number) and the full mode in which the number of the voltage levels to be applied is a predetermined number (second predetermined number) larger than that applied in the partial mode. The voltage range (second predetermined range) applied to the secondary transfer roller 61 when the patch image is transferred in the full mode is larger than the voltage range (first predetermined range) applied to the secondary transfer roller 61 when the patch image is transferred in the partial mode. Accordingly, if there is a possibility that the optimum secondary transfer voltage greatly varies, it is not necessary to repeatedly form a patch image, and prolongation of execution time of the setting mode can be suppressed.

Note that if the full mode is executed using the A3 size sheet S, four sheets S are used as described above. The image forming apparatus A of the present embodiment can form images on 100 sheets S per minute at the maximum. Therefore, if executing the full mode, the time difference is just for 3 sheets S (approximately 3 seconds) compared with the case where the eleven patch images are formed on the sheet S having A3 size by executing the partial mode. For this reason, in a situation in which the value of the optimum secondary transfer voltage greatly varies compared to the normal value, the time taken to select the optimum secondary transfer voltage is shorter when the full mode is executed.

Second Embodiment

Next, a second embodiment of the image forming apparatus A according to the present invention will be described. Parts that are the same as those in the first embodiment are not described specifically by using the same drawings and denoting the same reference numerals.

In the first embodiment, eleven patch images in total of ±5 levels with respect to the reference value of the secondary transfer voltage are formed in the partial mode. In the present embodiment, the number of patch images can be set in the partial mode.

Specifically, in step S3 illustrated in FIG. 3, in addition to the reference value of the secondary transfer voltage at the time of forming the patch image, the user sets the range of the secondary transfer voltage around the reference value and the frequency of formation of the patch images in terms of the level, whereby the number of patch images is set accordingly. That is, in the partial mode in which a plurality of patch images is transferred to the sheet S by switching the voltage to be applied to the secondary transfer roller 61 by a predetermined value within a predetermined range, the controller 30 sets the number of patch images by changing the predetermined range and the predetermined value.

For example, the user is set to form a patch image at ±15 levels around the reference value of the secondary transfer voltage. Accordingly, thirty-one patch images in total are formed. Alternatively, the user is set to form the patch images by ±20 levels at every two levels around the reference value of the secondary transfer voltage. Accordingly, twenty-one patch images in which the secondary transfer voltage is switched by 300 V around the reference value are formed.

In this manner, the number of patch images can be set in the setting mode, and the number of the patch images is reduced if the optimum secondary transfer voltage is predicted to vary just a little, and the number of patch images is increased if the optimum secondary transfer voltage varies significantly. Accordingly, it is possible to reduce the probability of repeated formation of patch images, so that prolongation of the execution time of the setting mode may be suppressed.

Note that, in the present embodiment, the configuration for setting the number of patch images in the partial mode has been described. However, the present invention is not limited thereto. In other words, the same effect as described above can be obtained even with the configuration in which the number of patch images can be set in one mode without dividing the mode into the partial mode and the full mode.

Third Embodiment

Next, a third embodiment of the image forming apparatus A according to the invention will be described. Parts that are the same as those in the first and second embodiments are not described specifically by using the same drawings and denoting the same reference numerals.

Figure 6:
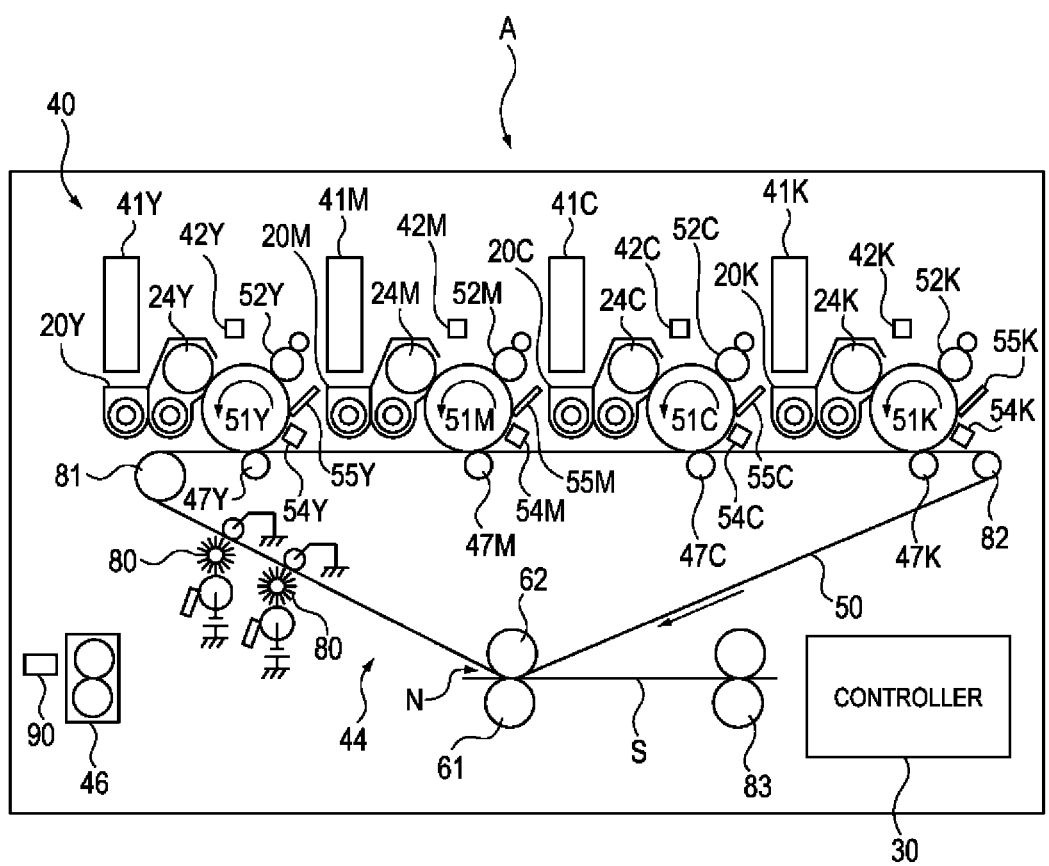
FIG. 6 is a schematic cross-sectional view of an image forming apparatus.

FIG. 6 is a schematic cross-sectional view of the image forming apparatus A according to the present embodiment. As illustrated in FIG. 6, in the image forming apparatus A of the present embodiment, an in-line spectroscopic sensor 90 configured to detect a patch image is provided at a position downstream of the fixing device 46 in the sheet conveying direction. Other mechanical configurations are the same as those of the first embodiment.

Figure 7:
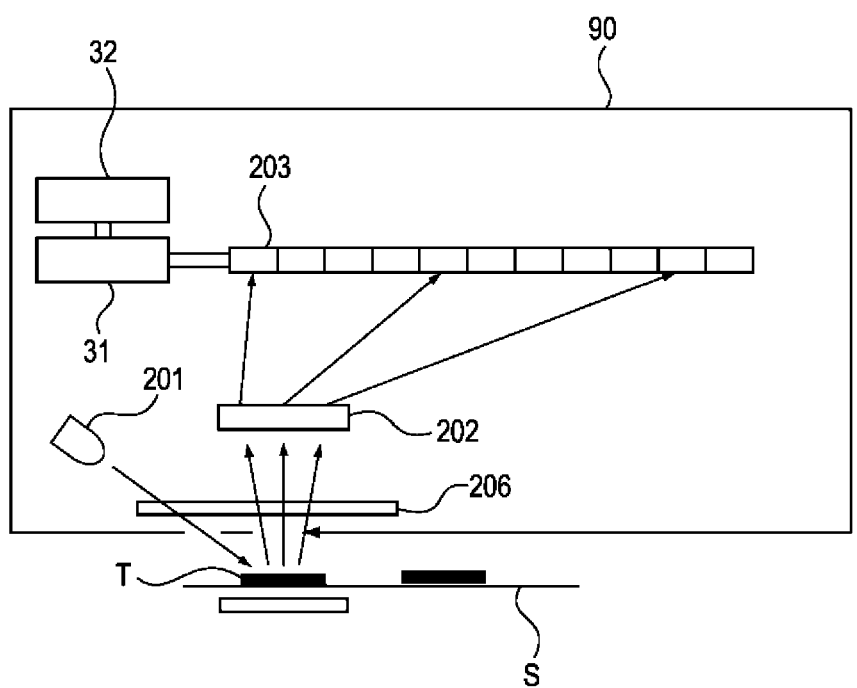
FIG. 7 is a schematic diagram of a spectroscopic sensor.

FIG. 7 is a schematic diagram of the spectroscopic sensor 90. As illustrated in FIG. 7, the spectroscopic sensor 90 includes a white LED 201 that irradiates light to the patch image T formed on the sheet S, and a diffraction grating 202 that disperses the reflected light reflected from the patch image T for each wavelength. Further, the spectroscopic sensor 90 also includes the lens 206 configured to collect the light irradiated from the white LED 201 on the patch image T and collect the light reflected from the patch image T on the diffraction grating 202.

Further, the spectroscopic sensor 90 includes a line sensor 203 including a plurality of pixels that detects light separated for each wavelength by the diffraction grating 202. The light intensity value of each pixel detected by the line sensor 203 is entered to the CPU 31 and subjected to various types of calculation and stored in the ROM 32.

Four spectroscopic sensors 90 are arranged in the sheet width direction orthogonal to the conveyance direction of the sheet S. These four spectroscopic sensors 90 individually detect a plurality of patch images formed at different positions in the sheet width direction. Note that the four spectroscopic sensors 90 may be used in such a manner that one patch image is detected by some of the four spectroscopic sensors 90, and the results of detection are averaged.

Figure 8A:
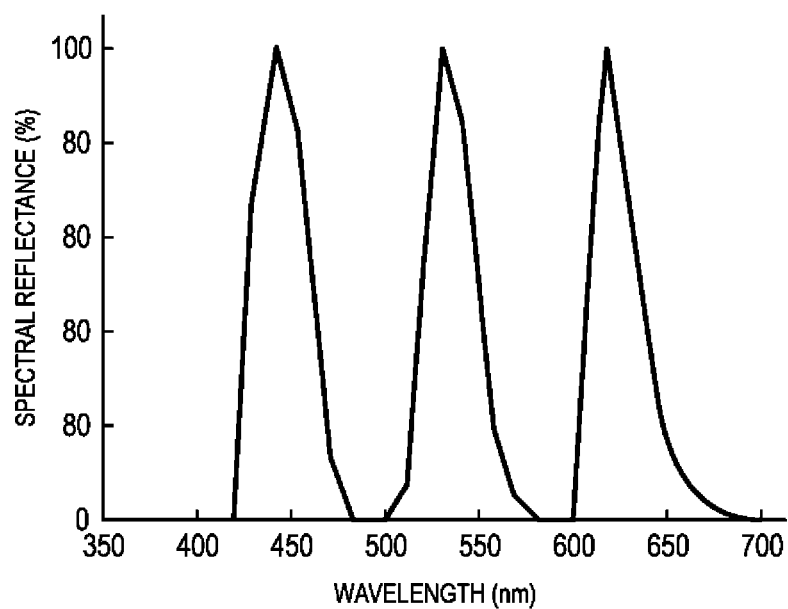
FIG. 8A and FIG. 8B are graphs each showing a status A filter and visual spectral characteristics.
Figure 8B:
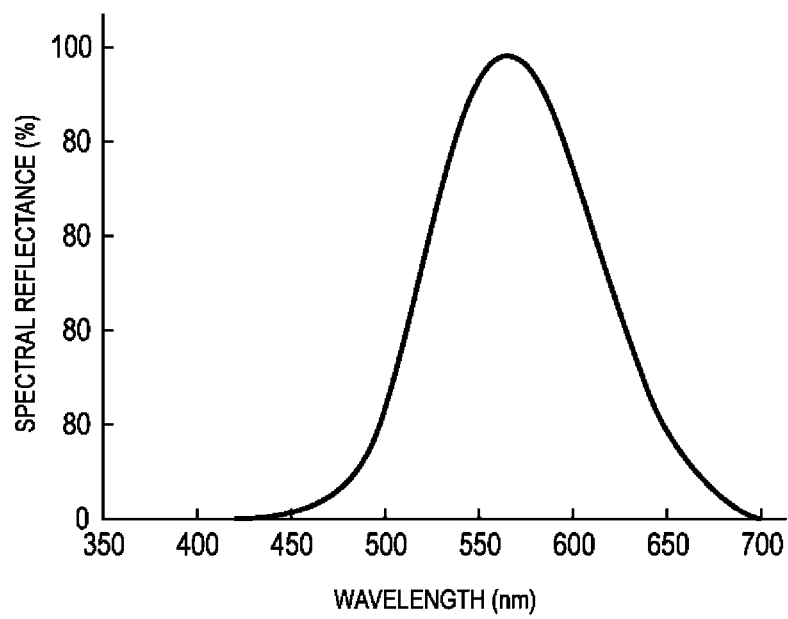

The results of detection of the patch image performed by the spectroscopic sensors 90 are entered to the CPU 31 as spectral reflectance data, and a density calculation is performed in the CPU 31. In a conversion calculation from spectral reflectance data to density value, a status A filter illustrated in FIG. 8A is used for yellow, magenta, and cyan patch images for the obtained spectral reflectance for each wavelength. The visual spectral characteristics (Visual) illustrated in FIG. 8B are used for the black patch image. The status A filter and the visual spectral characteristics are stored in the memory 31.

Further, the CPU 31 calculates a Lab value (chromaticity value) defined by the CIE (International Commission on Illumination) based on the spectral reflectance. The Lab values are calculated using a calculation method specified in ISO13655, with reference to the color matching functions $x(\lambda)$, $y(\lambda)$, $z(\lambda)$ specified in JIS Z8701, and the standard light spectral distribution SD50$\lambda$ specified in JIS Z8720.

Note that as a calibration process for the spectroscopic sensor 90, white LED light quantity adjustment using a white reference plate is performed to correct into the reference spectral reflectance. For this calibration process, a known process can be arbitrarily used.

<Setting Mode>

Next, a setting mode using the spectroscopic sensor 90 according to the present embodiment will be described using a flowchart illustrated in FIG. 9. Note that in the following description, steps of performing the same processes as those described with reference to FIG. 3 in the first embodiment are denoted by the same reference numerals, and description thereof is simplified.

Figure 9:
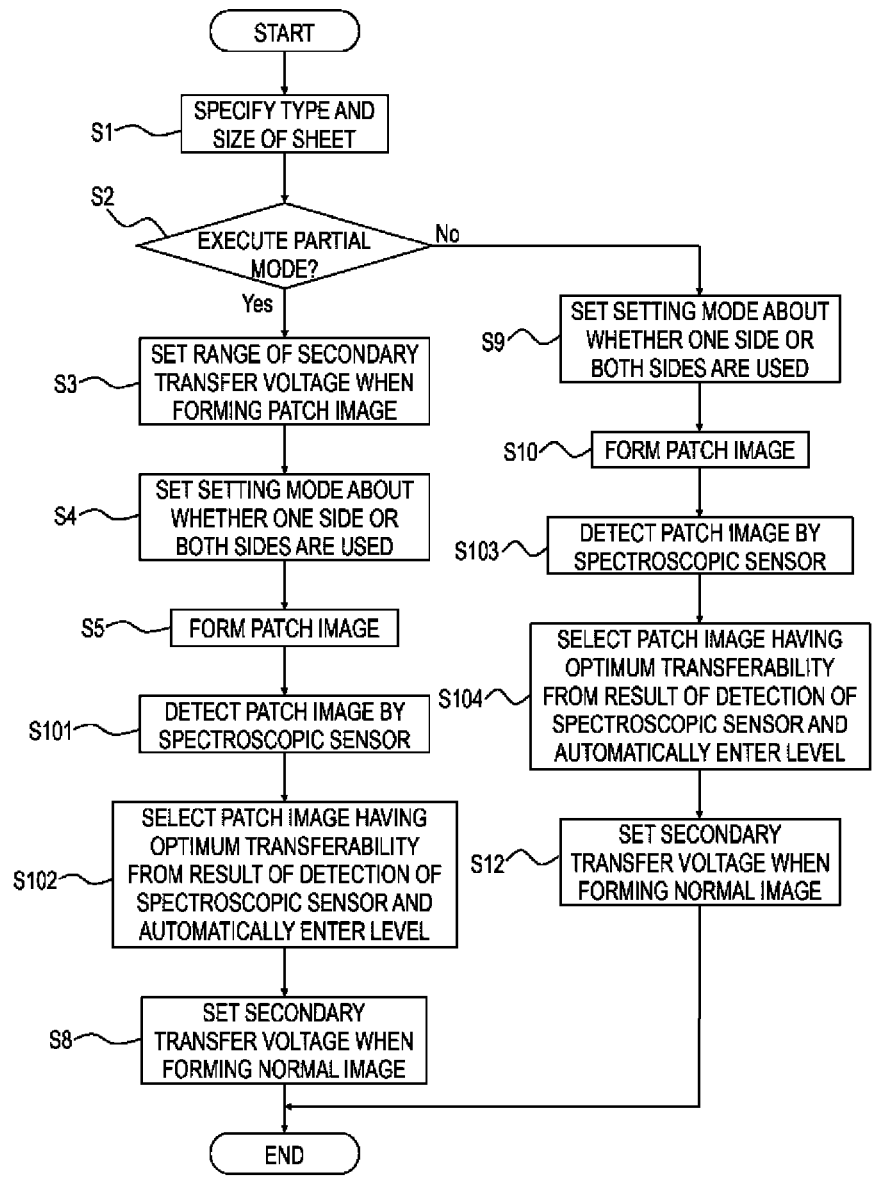
FIG. 9 is a flowchart of a setting mode.

As illustrated in FIG. 9, the user first operates the operation portion 70 to select a sheet cassette, not illustrated, in which the sheet S used for image formation is stored (S1). Next, the user selects whether to execute the full mode or the partial mode on the screen illustrated in FIG. 4A (S2).

Next, if the partial mode is selected, the user sets the reference value (center value) of the secondary transfer voltage when the patch image is formed and whether to implement the setting mode in one side or both sides of the sheet S (S3, S4). Next, when the user presses the "output test page" button illustrated in FIG. 4A, the secondary transfer voltage is switched at ±5 level with respect to the reference value, and eleven patch images are transferred to the sheet S (S5).

In contrast, if the full mode is selected, the user first sets whether the setting mode is to be performed on one side or on both sides of the sheet S (S9). Subsequently, when the user presses the "output test page" button illustrated in FIG. 4A, all patch images that can be formed by the image forming apparatus A are formed on the sheet S (S10).

Next, the patch image formed on the sheet S in the partial mode or the full mode is detected by the spectroscopic sensor 90 (S101, S103). The spectroscopic sensor 90 outputs spectral reflectance data of each patch image to the controller 30. The controller 30 converts the spectral reflectance of the black and gray (halftone) patch image into a density value, and converts the spectral reflectance of the blue patch image into a Lab value. Subsequently, the controller 30 selects a patch image in which the density value and the Lab value are predetermined values stored in the ROM 31 in advance, and automatically enters the level corresponding to the patch image as a level of the secondary transfer voltage on the screen illustrated in FIG. 4B (S102, S104). That is, the controller 30 causes the voltage applied to the secondary transfer roller 61 during image formation determined based on the result of detection performed by the spectroscopic sensor 90 to be displayed on the screen of the operation portion 70 as a default setting.

Note that if the density value and Lab value converted from the spectral reflectance of the patch image are not the predetermined value preset in the ROM 32, the controller 30 selects the patch image having the density value and Lab value closest to the predetermined value. However, in such a case, the patch image may be formed again by changing the reference value of the secondary transfer voltage as in step S6 of the first embodiment.

Next, on the screen illustrated in FIG. 4B, the user confirms the level of the automatically entered secondary transfer voltage and presses the "OK" button if there is no problem. If the user wants to change the level of the secondary transfer voltage, it is achieved by manually entering the level and pressing the "OK" button. Accordingly, the controller 30 sets the secondary transfer voltage corresponding to the selected level as the secondary transfer voltage to be applied during normal image formation and exits the setting mode (S8, S12). Note that the controller 30 may be configured not to display such a confirmation screen but to set a voltage to be applied to the secondary transfer roller 61 during image formation based on the result of detection performed by the spectroscopic sensor 90.

In this manner, in the present embodiment, the patch image is detected by the spectroscopic sensor 90, and the controller 30 selects and automatically enters the patch image according to the result of detection. Accordingly, the process of comparing patch images by the user is omitted or simplified, and the setting of the secondary transfer voltage can be simplified.

Note that in the present embodiment, the controller 30 calculates the density value and Lab value of the patch image based on the spectral reflectance data output from the spectroscopic sensor 90 and selects the patch image having the optimum transferability based on these values. However, the present invention is not limited thereto, and for example, the same effect as described above can be achieved even with a configuration in which the color difference V between the sheet S and the patch image is obtained using the spectroscopic sensor 90 and the patch image is selected based on the color difference V.

Here, the color difference V is a distance between two points in a three-dimensional space of the Lab and is calculated by the following equation 1.

$$V=((L \text{ element of sheet } S-L \text{ element of patch image } T)^2+(a \text{ element of sheet } S-a \text{ element of patch image } T)^2+(b \text{ element of sheet } S-b \text{ element of patch image } T)^2)^{0.2} \quad (1)$$

In the present embodiment, although the spectroscopic sensor 90 is used as the image detecting unit configured to detect the patch image, a CIS type or CCD type image sensor (optical sensor) may be used instead of the spectroscopic sensor 90. In this case, the image sensor detects the light intensity through filters corresponding to red, green, and blue, and the controller 30 calculates the light intensity by converting it into a density value. The controller 30 selects a patch image in which the density value is a predetermined value stored in the ROM 32 in advance, and automatically enters the level of the secondary transfer voltage corresponding to the patch image as a level of the secondary transfer voltage on the screen illustrated in FIG. 4B).

In the present embodiment, although the spectroscopic sensor 90 is disposed on the conveyance path of the sheet S, the present invention is not limited thereto. That is, for example, the spectroscopic sensor 90 may be arranged on the upper part of the main body of the image forming apparatus A, and the sheet S on which the patch image is formed may be placed on the spectroscopic sensor 90 and scanned by a user.

Fourth Embodiment

Next, a fourth embodiment of the image forming apparatus A according to the present invention will be described. Parts that are the same as those in the first to third embodiments are not described specifically using the same drawings and denoting the same reference numerals.

In the present embodiment, default settings of the partial mode and the full mode are changed according to the number of times of execution of the setting mode. Specifically, in the setting mode illustrated in FIG. 3, when a patch image is formed on the sheet S specified for the first time in step S1, the controller 30 makes the screen of the operation portion 70 illustrated in FIG. 4A display a screen in which the full mode is automatically selected as a default setting. That is, the controller 30 displays a screen illustrated in FIG. 4A with the "output all adjustment values" button checked. This is because when the patch image is formed in the partial mode on the sheet S in which the setting mode is executed for the first time, it is difficult to find the optimum value of the voltage to be applied to the secondary transfer roller 61 during image formation.

In contrast, when a patch image is formed on the sheet S specified in the past in step S1, the controller 30 displays a screen on the operation portion 70 illustrated in FIG. 4A in a state in which the partial mode is selected as a default setting. That is, the controller 30 displays the screen illustrated in FIG. 4A with the "output adjustment values nearby" button automatically checked. This is because when the setting mode is executed again on the sheet S for which the setting mode has been executed in the past, it is difficult to assume a significant change in the optimum value of the secondary transfer voltage to be applied during image formation, and it is considered that fine adjustment is sufficient, so that executing the partial mode is sufficient. Note that the user can also execute the full mode in the second and subsequent modes by changing the check.

Further, the controller 30 determines whether the number of times of execution of the setting mode for the sheet S specified in step S2 is the first time or the second time or later as follows. That is, data in which the sheet S set in step S1 and the number of times of execution of the setting mode for the sheet S are associated is stored in the ROM 32. By accessing the data, the CPU 31 determines whether the number of times of execution of the setting mode for the sheet S specified in step S1 is the first time or the second time or later.

In this manner, according to the configuration of the present embodiment, the default setting of the partial mode and the full mode is automatically changed as appropriate, so that the user can easily execute the setting mode and the usability can be improved.

Fifth Embodiment

Next, a fifth embodiment of the image forming apparatus A according to the present invention will be described. Parts that are the same as those in the first to fourth embodiments are not described specifically by using the same drawings and denoting the same reference numerals.

In the present embodiment, default settings of the partial mode and the full mode are changed according to the presence or absence of setting of the type of and the brand information on the sheet S on which the setting mode is executed. Specifically, in the setting mode illustrated in FIG. 3, if the type of and the brand information on the sheet S is specified in Step S1, the controller 30 makes the screen of the operation portion 70 illustrated in FIG. 4A display a screen in which the partial mode is automatically selected as a default setting. That is, the controller 30 displays the screen illustrated in FIG. 4A with the "output adjustment values nearby" button checked. This is because if the reference value of the secondary transfer voltage is set when a patch image is formed according to the type of and the brand information on the sheet S, deviation between the set reference value and the optimum value of the secondary transfer voltage to be applied during image formation is likely to be small. Note that the user can also execute the full mode by changing the check.

In contrast, if the type or brand information of the sheet S is not specified in step S1, or if the type of and the brand information on the sheet S is not registered in the image forming apparatus A, the controller 30 makes the screen of the operation portion 70 illustrated in FIG. 4A display a screen in which the full mode is automatically selected as a default setting. That is, the controller 30 displays a screen illustrated in FIG. 4A with the "output all adjustment values" button checked. This is because if the sheet S for executing the setting mode is not specified, deviation between the reference value of the secondary transfer voltage when the patch image is formed by executing the partial mode and the optimum value of the secondary transfer voltage to be applied during image formation is likely to be large. Note that the user can also execute a partial mode by changing the check.

Note that if the type of and the brand information on the sheet S is not specified in step S1, or if the type of and brand information on the specified sheet S is not registered in the image forming apparatus A and the user selects the partial mode on the screen of the operation portion 70, the controller 30 performs the following control. That is, the controller 30 makes the user enter only the surface property (coated sheet, plain paper, recycled sheet, etc.) of the sheet S for executing the setting mode and the basis weight (thickness) of the sheet S on the screen of the operation portion 70 to set a reference value of the secondary transfer voltage during patch image formation according to the entered value.

In this manner, according to the configuration of the present embodiment, the default setting of the partial mode and the full mode is automatically changed as appropriate, so that the user can easily execute the setting mode and the usability can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-012272, filed Jan. 28, 2019, which is hereby incorporated by reference herein in its entirety.

What is claimed is:

1. An image forming apparatus comprising:
   an image bearing member;
   a transfer member configured to transfer a toner image formed on the image bearing member to a recording material at a transfer position;
   a voltage source configured to apply a transfer voltage to the transfer member;
   a controller configured to execute a setting mode of outputting a test chart for setting the transfer voltage during non-image formation and of setting the transfer voltage to be applied to the transfer member during image formation based on the test chart; and
   an operation portion configured to input information for instructing the setting mode to be executed,
   wherein the test chart is formed by transferring a plurality of test images to at least one recording material, and the plurality of test images are transferred by applying a plurality of different test voltages to the transfer member in the setting mode,
   wherein the controller is configured to control the voltage source so that the transfer voltage set in the setting mode is applied to the transfer member while a predetermined region of the recording material passes through the transfer position during image formation,
   wherein the setting mode includes a plurality of setting modes including a first setting mode in which a number of the plurality of test voltages is a first predetermined number and a second setting mode in which a number of the plurality of test voltages is a second predetermined number greater than the first predetermined number, and
   wherein the operation portion is configured to input the information for instructing the setting mode to be executed from among the plurality of setting modes.

2. The image forming apparatus according to claim 1, wherein a range of the test voltages to be applied in the first mode is a first predetermined range, and a range of the test voltages to be applied in the second mode is a second predetermined range larger than the first predetermined range.

3. The image forming apparatus according to claim 1, wherein the second setting mode is previously selected as the setting mode to be executed in the operation portion.

4. The image forming apparatus according to claim 1, wherein the operation portion is configured to allow an input of a type of the recording material on which the setting mode is to be executed, and
wherein the second setting mode is automatically selected as the setting mode to be executed if the type of the recording material inputted via the operation portion is a new type, and the first setting mode is automatically selected as the setting mode to be executed if the type of the recording material inputted via the operation portion is not new.

5. The image forming apparatus according to claim 1, further comprising an image detecting unit configured to detect the test images,
wherein the controller sets the transfer voltage to be applied to the transfer member during image formation based on a result of detection detected by the image detecting unit in the setting mode.

6. The image forming apparatus according to claim 5, wherein
the image detecting unit outputs data relating to spectral reflectance of the test images based on reflected light reflected from the test images, and
the controller sets the transfer voltage to be applied to the transfer member during image formation based on the data in the setting mode.

7. The image forming apparatus according to claim 5, wherein the image detecting unit is an optical sensor.

8. The image forming apparatus according to claim 1, further comprising a current detecting unit configured to detect a value of a current that flows when a voltage is applied to the transfer member,
wherein the controller is configured to execute another setting mode for setting the transfer voltage to be applied to the transfer member during image formation based on a relationship between a voltage applied to the transfer member during non-image formation and a current detected by the current detecting unit at that time, and
wherein the controller sets the transfer voltage to be applied to the transfer member during image formation based on a voltage value set in the setting mode and the relationship obtained in the other setting mode.

9. The image forming apparatus according to claim 1, wherein the controller is configured to output information about voltage levels of the plurality of test voltages to the test chart when the plurality of test images is transferred onto the recording material,
the operation portion is configured so that the information corresponding to one test image selected from the plurality of test images can be inputted when the setting mode is executed, and
the controller sets the transfer voltage to be applied to the transfer member while the predetermined region of the recording material passes through the transfer position during image formation on the basis of the information corresponding to the one test image inputted through the operation portion.

* * * * *